May 4, 1948.  W. P. JOHNSON  2,441,072
OPERATING MEANS FOR SEED DROPPING DEVICES
Filed Jan. 29, 1945
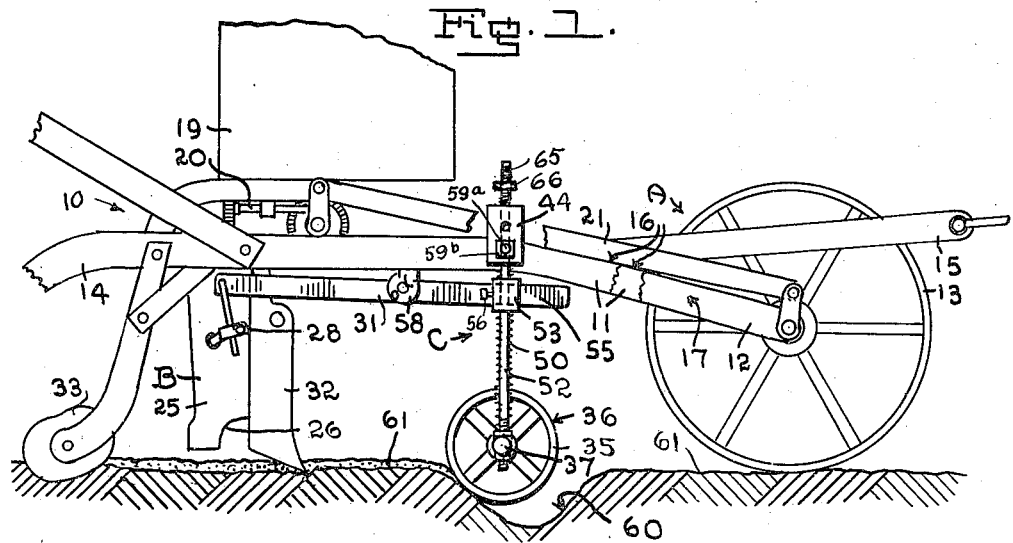
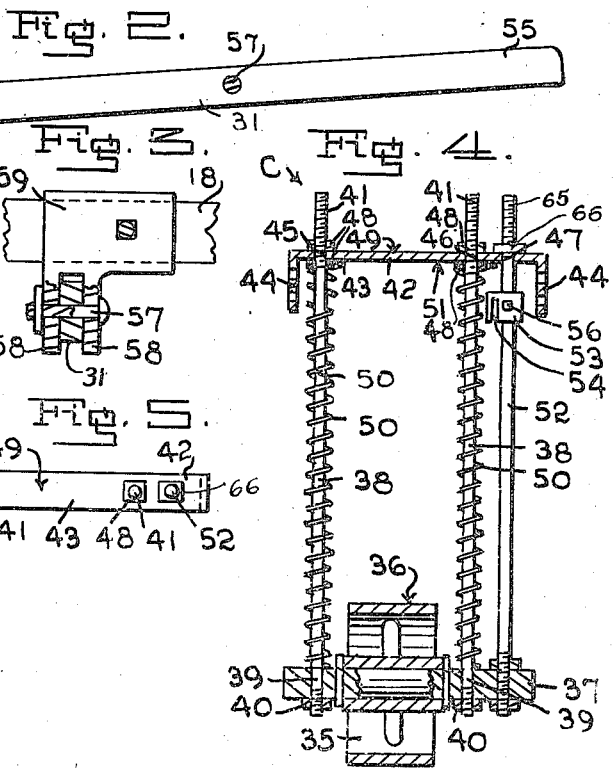
INVENTOR.
Willis P. Johnson
ATTORNEYS.

Patented May 4, 1948

2,441,072

UNITED STATES PATENT OFFICE 2,441,072

OPERATING MEANS FOR SEED DROPPING DEVICES

Willis P. Johnson, Greenwood, Miss.

Application January 29, 1945, Serial No. 575,143

4 Claims. (Cl. 275—9)

This invention relates to planting and more particularly to drilling.

An important object of the invention is to provide novel means for operating seed-dropping devices of planters, so that there is a more accurate droppage of seeds, whereby a check-row planting may be made, without loss of seed, and with all the rows uniformly and fully planted.

Another important object is to provide new means for operating the valve of seed dropping devices, which means is not a part of the mechanism employed to discharge seed from the hoppers into the seed-dropping devices.

Still another major object is to provide means for operating the valve of seed droppers, forming a part of wheeled seed planters, which means includes a portion having a dual function.

Another object is to provide for changes in the time of operation of the seed dropper.

Other objects and advantages of the invention will be apparent during the following detailed description of the invention, taken in connection with the accompanying drawing, forming a part thereof, and in which drawing:

Fig. 1 is a side elevation of a seed planter equipped with the novel operating means for the seed dropper thereof.

Fig. 2 is a side elevation of a portion of this novel operating means.

Fig. 3 is a pivoted support associated with the portion shown in Fig. 2.

Fig. 4 is a vertical longitudinal section through another portion of the new operating means.

Fig. 5 is a top plan of the portion of Fig. 4.

Fig. 6 is an illustration of a method of planting, employing a planter equipped with the novel operating means.

In the drawing, wherein for the purpose of illustration is shown a preferred embodiment of the invention and wherein similar reference characters designate corresponding parts throughout the several views, the seed planter is designated by the letter A, while the novel operating means for the seed dropper B thereof, is designated by the letter C.

The seed planter A, shown by way of example, includes a frame 10 having substantially paralleling, horizontally-disposed side members 11 which extend forwardly as at 12 and are supported by a drive wheel 13 and at their rearward ends 14 they may be supported in any conventional way, as by a wheel or wheels (not shown). Forwardly of the side members 11 is a tongue 15. Preferably, the side members 11 comprise metallic bars having upper flat faces 16 and outer vertical side faces 17. Bridging the side members 11 is a transverse member 18 intermediate their length.

Supported by the side members 11 is a hopper 19 for seed or like material, for planting. Associated with this hopper 19 is suitable means 20 to cause a relatively measured quantity of seed or the like to be discharged from the hopper 19 into the seed dropper B, and this means 20 is operatively connected with a pitman 21, which is, in turn, connected with the drive wheel 13.

The seed dropper B includes a suitable vessel 25 supported in any suitable way by the frame 10, having a downwardly-opening discharge spout or mouth 26 closed by a flap valve 27 forming part of a valve means 28 which means also includes a bell crank 29 which may be pivoted to the opposite walls of the vessel 25 and extends outwardly of the vessel where it is pivotally connected to one end portion 30 of level 31 to be subsequently described.

The discharge spout or mouth 26 is so disposed that seed discharged therefrom usually falls on or adjacent an imaginary center line extending longitudinally of the planter A.

Associated with seed planters is usually a small furrow opener 32 disposed forwardly of the seed dropper B, adapted to open a shallow furrow to accommodate the seed, but this may be dispensed with, when the planter A is provided with the novel means C (although Fig. 1 shows this furrow opener 32, so that its location, shape and function, if the means C is not provided, may be seen). Rearwardly of the seed dropper B may be a conventional furrow-closing means 33.

As for the novel operating means C for the seed dropper B, the same includes a roller 35 having a broad periphery 36. This roller 35 is preferably of iron or steel and, for example, may be six inches in diameter, with a periphery width of 3½ inches. The broad periphery is important.

The roller 35 is carried by an axle 37 which extends outwardly beyond the roller and the latter is freely rotatable thereon.

Slidably secured to the axle 37 in any suitable way are a pair of spaced apart upright rods or members 38, one adjacent each end of the axle 37. For example, the lower ends 39 of the rods 38 may be provided with screw threads and slidably extend through and outwardly of suitable perforations in the axle 37 with nuts 40 screwed on the outer extremities of the rods 38 to the lower side of the axle.

Adjacent the upper ends 41 of the rods 38 is a horizontally-disposed member 42 which may be a suitable length of flat metal stock, formed to provide a central portion 43 and two downturned end portions 44. The central portion 43 is provided with three spaced-apart perforations or holes 45, 46 and 47. Through the perforations 45 and 46 extend the upper ends 41 of the rods 38, so that they protrude some distance upwardly of the central portion 43. These ends 41 may be screw threaded and suitable nuts 48 may be screwed thereon to contact the upper face 49 and lower face 51 of the central portion 43 of the member 42. Thus, the rods 38 may be adjusted with relation to the member 42, but the nuts 48 provide means, in conjunction with the last-named screw threads to prevent sliding movement with respect to the member 42, of the rods 38.

Means to force the roller 35 away from the member 42 may be a pair of expansion coil springs 50, one about each rod 38, bearing against the axle 37 at their lower ends and against the under or lower face 51 of the central portion 43. While, naturally, the roller is of some weight in itself, it is the coil springs 50 and the fact that their tension may be adjusted (by means of the nuts 48) which contribute a downwardly urge of the roller 35, greater than the mere gravity pull upon the latter.

Extending upwardly from the axle 37 and rigidly secured thereto in any suitable way is an upright or rod 52, which rod slidably extends through and upwardly of the perforation 47 in the central portion 43. Carried by the upright 52 is a suitable means 53 for retaining one end portion of the lever 31 to the upright 52. For example, this may be a fitting surrounding the upright 52, having a slot 54 through which extends the end portion 55 of the lever 31, and allowing some play. The fitting carries an adjustment screw 56, whereby the fitting may be slid along the upright 52 and secured in a fixed position.

Intermediate its ends, the lever 31 is provided with a suitable fulcrum which may be a pivot pin 57 extending through a perforation in the lever 31 intermediate its ends, the pin 57 being supported by depending perforated ears 58 carried by a bracket 59 secured, for example, to the transversely-extending member 18 of the frame 10.

The downturned end portions 44 of the member 42 are provided with perforations receiving any suitable means, as a conventional bolt shank 59a and nut 59b thereon, both shown in Fig. 1, to assist in suitably securing the member 42 to the side members 11 so that the member 42 bridges these members 11, whereby the roller 35 is positioned so that, as it rolls over the said surface, if the soil is at all in a condition for planting, it will sink into the soil enough to form a broad shallow furrow. Since the seed dropper B is rearwardly of it and the mouth 26 of the dropper B is so positioned as to discharge into this furrow, the furrow opener 32 may be dispensed with.

From this, it will be seen that the operation of the means C is independent of the means 20 to cause a measured quantity of seed to be discharged from the hopper 19 into the seed dropper B. Where means, of the nature of means C, is combined with means of the nature of means 20, there are often conditions which develop, throwing both out of action, owing to the necessity of supplying various movable portions, such as cam-surfaced devices, and the like.

Attention is directed to the fact that the roller 35 is positioned intermediate the vertical planes of the side members 11, not outwardly thereof, and so disposed as to provide the shallow furrow mentioned. Its major function is, however, to provide for operation of the other portions of the means C, as follows. A suitable parcel of land is furrowed, with any suitable instrument or machine to provide a plurality of paralleling, shallow furrows 60, as in Fig. 6, between which are a plurality of paralleling relatively flat spaces 61 (although these spaces 61 may be somewhat ridged, due to the provision of the furrows 60). Now, by operating one or more planters, equipped with the novel means C and seed droppers B, along paths normal to the furrows 60 as the planters move, seed will be discharged from the hopper 19 into the seed dropper B and a measured quantity accumulate therein. As the roller 35 rotates and rolls forward, it will form a furrow, due to the urge of the springs 50 and its weight, and this furrow will be, due to the relative positions of the roller 35 and mouth 26 of the seed dropper, directly below the mouth 26. Therefore, as the roller 35 advances and enters a furrow 60, it will cause movement of the lever 31, opening the valve 27 and this will permit the seed, accumulated in the dropper B, to fall into the furrow created by the roller, and be subsequently covered by the means 33. The seed, of course, does not drop into the furrows 60, since it is discharged or dropped as the roller 35 enters the furrow 60, but the seed is dropped upon the soil in the spaces 61 between the furrows 60, as shown at 62 in Fig. 6.

Since the roller 35 is, so to speak, floating, it will roll up and over a stone or clod without operating the valve means in the seed dropper B.

Any suitable means may be provided to prevent reciprocation of the upright 52, without the exercise of invention, as providing screw threads in the upper end 65 of the upright and a nut 66 therefor contacting the upper face 49 of the member 42, so that the means C will not operate while the planter A is being moved to the area to be planted.

It is apparent that tension upon the springs 50 may be varied, depending upon soil conditions and that the means C, represented by the structure 35 to 53, may be moved toward or away from the means B so as to effect faster or slower action of the valve means.

Various changes may be made to the form of invention herein shown and described without departing from the spirit of the invention or scope of the claims.

What is claimed is:

1. In combination with a seed dropper having a valve means for controlling the seed discharge therefrom, and means for securing said dropper to a planter frame, means, actuated by spaced-apart depressions in a field, for operating said valve means including a roller constructed and arranged to enter and leave said depressions, an axle for said roller, an upright rod slidably secured at adjacent its lower end to said axle, a member provided with a perforation secured to said frame, with said rod extending through said perforation, means limiting downward sliding of said rod, yieldable means to force said roller away from said member, a second upright rod rigidly secured to said axle at adjacent the lower end of said second rod and substantially paralleling said first rod, a lever movably secured to said second rod, means pivoting said lever to said frame, and means securing said lever to said valve means for actuation of the valve thereof.

2. In combination with a seed dropper having a valve means for controlling the seed discharge therefrom, and means for securing said dropper to a planter frame, means, actuated by spaced-apart depressions in a field, for operating said valve means including a roller constructed and arranged to enter and leave said depressions, an axle for said roller, an upright rod slidably secured at adjacent its lower end to said axle, a member provided with a pair of perforations, secured to said frame, with said rod extending through one of said perforations, a second upright rod rigidly secured to said axle at the lower end portion of said second rod and extending upwardly through the other of said perforation and slidable therethrough, means limiting downward movement of said first rod, yieldable means limiting upward movement of said first rod, a lever movably secured to said second rod, means pivoting said lever to said frame, and means securing said lever to said valve means for actuation of said valve thereof.

3. In valve-actuating means for a valve-operated seed dropper of a wheeled seed planter, adapted to traverse a field provided with a plurality of spaced-apart depressions, a ground roller constructed and arranged to enter said depressions, an axle therefor, a pair of spaced-apart uprights slidably secured to said axle, a horizontally-disposed member, above said roller, provided with a plurality of spaced-apart perforations, the upper portion of said uprights being rigidly carried by said member, with said uprights in two of said perforations, means normally urging said roller away from said member and into the soil and said depressions, comprising expansion coil springs about said uprights, means to secure said member to the frame of said seed planter, a vertically-disposed rod rigidly secured at one end to said axle and slidably carried by said member with the upper end portion of said rod extending through one of said perforations, and a lever operatively connected between said rod and the valve of said valve means.

4. In a valve-actuating means for a valve-operated seed dropper of a wheeled seed planter adapted to traverse a field provided with a plurality of spaced-apart depressions, a ground roller constructed and arranged to enter said depressions, an axle therefor, a pair of spaced-apart uprights slidably secured to said axle, a horizontally-disposed member, above said roller, provided with a plurality of spaced-apart perforations, the upper portion of said uprights extending through said member, with said uprights in two of said perforations, means adjustably securing said uprights to said member, means normally urging said roller away from said member and into the soil and said depressions, comprising expansion coil springs about said uprights, means to secure said member to the frame of said seed planter, forwardly of said seed dropper and so that seed discharged therefrom will fall upon the path travelled by said roller, a vertically-disposed rod rigidly secured at one end to said axle and slidably carried by said member with the upper end portion of said rod extending through one of said perforations, and a lever operatively connected between said rod and the valve of said valve means.

WILLIS P. JOHNSON.

REFERENCES CITED

The following references are of record in the file of this patent:

UNITED STATES PATENTS

| Number | Name | Date |
| --- | --- | --- |
| 381,223 | DuCray | Apr. 7, 1888 |
| 654,548 | Latismiere | July 24, 1900 |
| 1,063,127 | Joyce | May 27, 1913 |
| 1,329,375 | Collins | Feb. 3, 1920 |
| 1,348,130 | Hevel et al. | July 27, 1920 |
| 1,903,836 | Ray | Apr. 18, 1933 |
| 2,155,443 | Parks et al. | Apr. 25, 1939 |

FOREIGN PATENTS

| Number | Country | Date |
| --- | --- | --- |
| 398,184 | France | Mar. 16, 1909 |